(12) United States Patent
Choi

(10) Patent No.: US 8,832,605 B2
(45) Date of Patent: Sep. 9, 2014

(54) METHOD AND SYSTEM FOR CONTROLLING FUNCTIONS IN A MOBILE DEVICE BY MULTI-INPUTS

(75) Inventor: Won Seok Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 276 days.

(21) Appl. No.: 13/070,860

(22) Filed: Mar. 24, 2011

(65) Prior Publication Data

US 2011/0239166 A1 Sep. 29, 2011

(30) Foreign Application Priority Data

Mar. 24, 2010 (KR) .................. 10-2010-0026342

(51) Int. Cl.
*G06F 3/01* (2006.01)
*G06F 3/041* (2006.01)

(52) U.S. Cl.
USPC ........... 715/863; 715/864; 715/765; 345/173; 345/169

(58) Field of Classification Search
USPC ......... 715/764, 765, 810, 835, 840, 863, 864; 345/169, 173
See application file for complete search history.

(56) References Cited

U.S. PATENT DOCUMENTS

| 6,453,471 | B1 * | 9/2002 | Klosterman | .................... 725/41 |
| 6,894,679 | B2 * | 5/2005 | Suzuki | .......................... 345/169 |
| 2010/0309116 | A1 * | 12/2010 | Oh | ............................... 345/156 |

* cited by examiner

*Primary Examiner* — Xiomar L Bautista
(74) *Attorney, Agent, or Firm* — Jefferson IP Law, LLP

(57) ABSTRACT

A method and system for providing control functions in a mobile device according to modes of inputs are provided. The method includes receiving a proximity signal via a sensing module, detecting a touch signal via a touch screen while the proximity signal is being retained, and executing a function set according to the input mode of the touch signal.

5 Claims, 7 Drawing Sheets

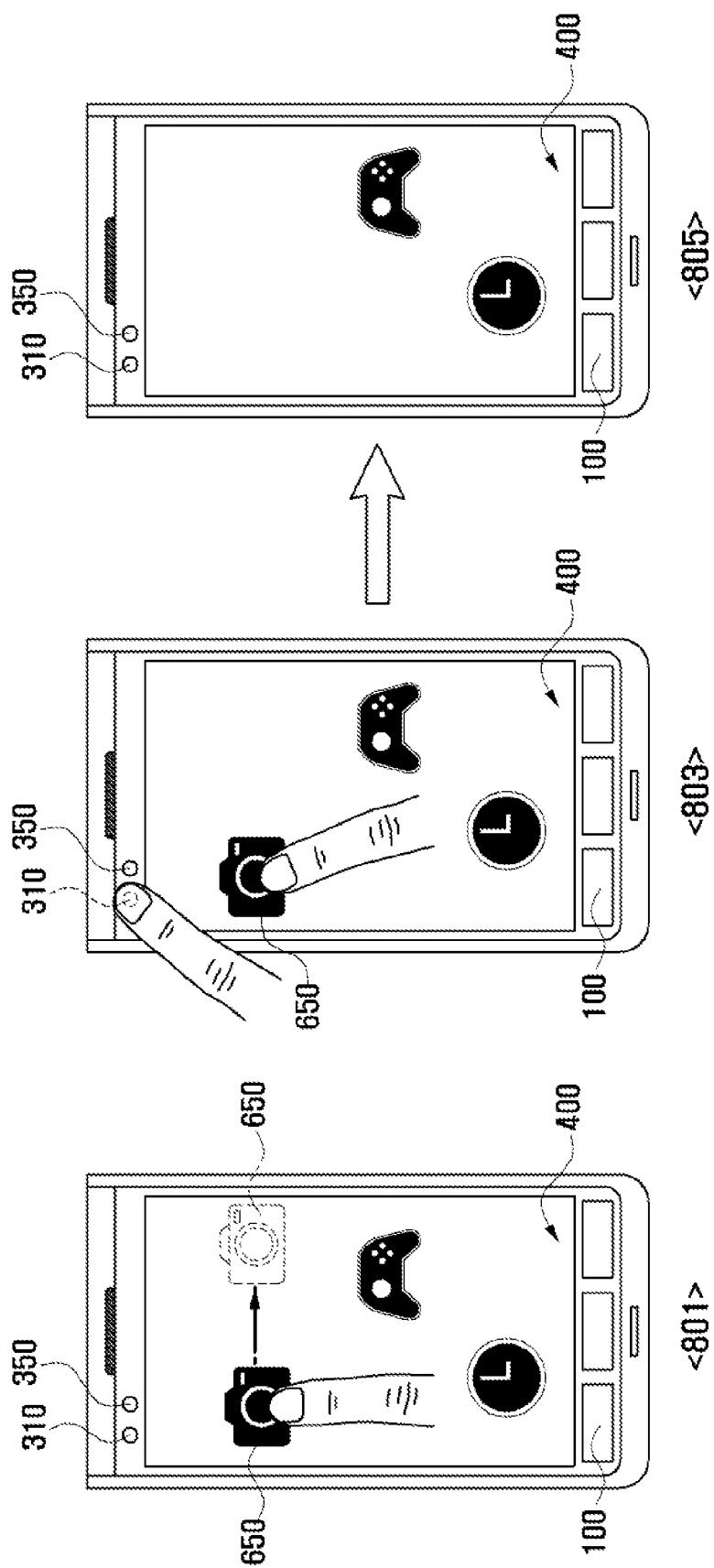

METHOD AND SYSTEM FOR CONTROLLING FUNCTIONS IN A MOBILE DEVICE BY MULTI-INPUTS

PRIORITY

This application claims the benefit under 35 U.S.C. §119(a) of a Korean patent application filed on Mar. 24, 2010 in the Korean Intellectual Property Office and assigned Serial No. 10-2010-0026342, the entire disclosure of which is hereby incorporated by reference.

BACKGROUND OF THE INVENTION

1. Field of the Invention

This invention relates to communication systems. More particularly, the present invention relates to a method and system that controls functions in a mobile device according to modes of inputs that are detected by at least two sensing devices.

2. Description of the Related Art

As a result of the development of information and communication technology and semiconductor technology, the use of various types of mobile devices has also increased. Mobile devices utilize mobile convergence to provide additional service functions provided by other types of mobile systems, as well as their traditional service functions. For example, a mobile communication device can include additional functions as well as its usual communication functions such as a voice call, and message transmission and reception. Examples of the additional functions include a TeleVision (TV) viewing function (e.g., mobile broadcasting, such as Digital Multimedia Broadcasting (DMB), Digital Video Broadcasting (DVB), and the like), an audio playback function (e.g., Moving Picture Expert Group (MPEG)-1 or MPEG-2 Audio Layer 3 (MP3)), a photographing function, an Internet access function, and the like.

Conventional mobile devices have a limitation in terms of space allocated for their display units or input units (e.g., keypads, and the like) because they have been designed to provide mobility and portability. In order to use the conventional mobile devices, users have been operating menus that are complicatedly configured.

Therefore, a need exits for a method and system for controlling mobile devices according to modes of inputs, thereby allowing users to efficiently use a variety of functions provided by the mobile devices.

SUMMARY OF THE INVENTION

An aspect of the present invention is to address at least the above problems and/or disadvantages and to provide at least the advantages described below. Accordingly an aspect of the present invention is to provide an input system that can use different types of devices in the mobile device.

Another aspect of the present invention is to provide a mobile device with different types of input devices, and a method that can control functions of the mobile device according to modes of inputs detected by the input devices.

Still another aspect of the present invention is to provide an input environment where functions of a mobile device can be controlled according to a single input or multi-inputs created by a combination of a touch screen module and a sensing module.

In accordance with an aspect of the present invention, a method for controlling functions in a mobile device via multi-inputs is provided. The method includes receiving a proximity signal via a sensing module, sensing a touch signal via a touch screen while the proximity signal is being retained, and executing a function set according to input mode of the touch signal.

In accordance with another exemplary embodiment of the invention, a method for controlling functions in a mobile device by multi-inputs is provided. The method includes sensing an input event, controlling, when the input event is a touch signal for a single input, a first function mapped to the touch signal, and controlling, when the input event is a touch signal for multi-inputs, a second or third function according to the input mode of the touch signal.

In accordance with still another exemplary embodiment of the invention, a method for controlling functions in a mobile device is provided. The method includes displaying screen data, determining, when an input of a first device is detected, whether there is an input of a second device, performing, when there is not an input of a second device, a first function according to a single input of the first device, and performing, when there is an input of a second device, a second function according to multi-inputs via the first and second devices.

In accordance with another exemplary embodiment of the invention, the invention provides a mobile device including a display unit for displaying screen data and receiving a touch signal, a sensing module for receiving a proximity signal, and a controller for controlling functions according to touch signals for respective single inputs and controlling a first or second function set according to an input mode of the touch signal for multi-inputs via the display unit and the sensing module.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 8 illustrates exemplary screens describing a method for controlling functions in a mobile device via a single input and multi-inputs, according to an exemplary embodiment of the present invention.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention support a multi-input function via different devices. The exemplary embodiments of the present invention combine signals input respectively by the different devices, and controls the functions of a mobile device according to types of combined signals, i.e., a single input or multi-inputs. The devices each include a touch screen and a sensing module. The sensing module includes an illumination sensor, a proximity sensor, a camera module, and the like.

In the following description, configuration and operations of the mobile device according to the exemplary embodiments of the present invention are described in detail with reference to FIGS. 1 to 4. However, it should be understood that the present invention is not limited thereto and various modifications may be applied.

Figure 1:
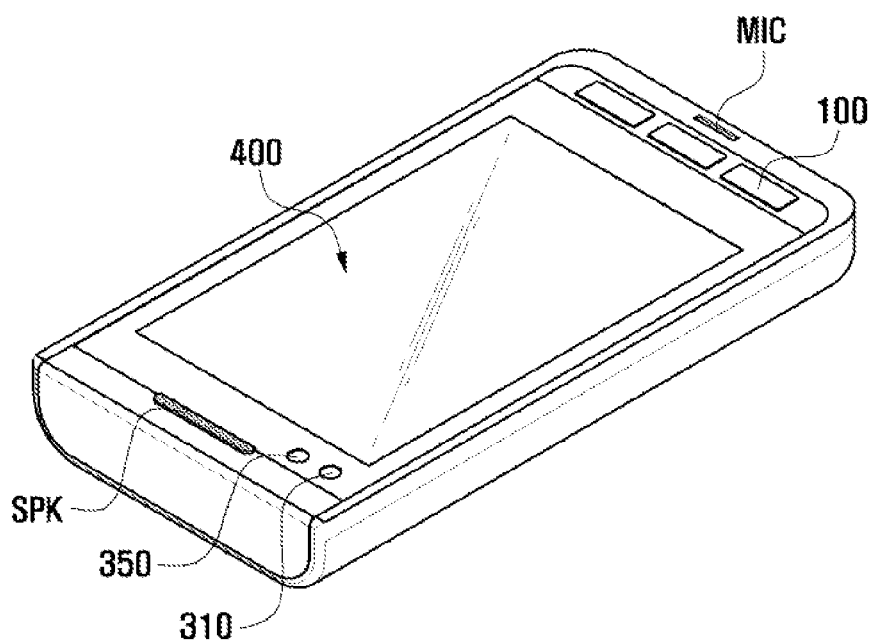
FIG. 1 illustrates a perspective view of a mobile device according to an exemplary embodiment of the present invention.

FIG. 1 illustrates a perspective view of a mobile device according to an exemplary embodiment of the present invention.

Figure 2:
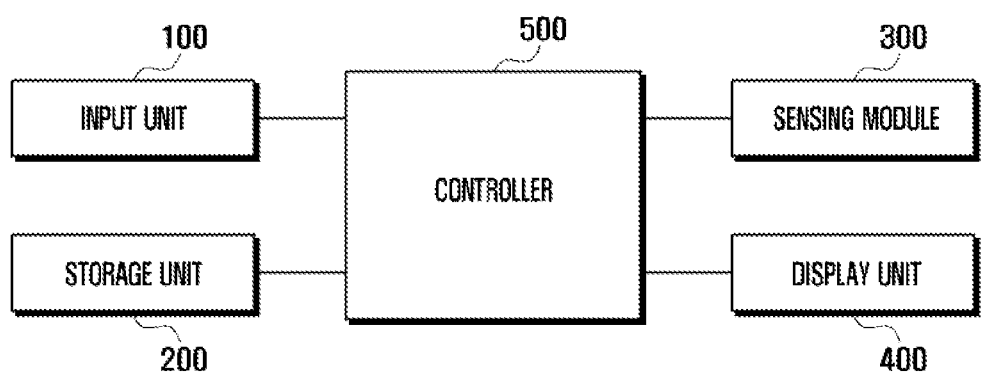
FIG. 2 illustrates a schematic block diagram of a mobile device according to an exemplary embodiment of the present invention.

Referring to FIG. 1, the mobile device will be described based on a bar type mobile device with a full touch screen. The mobile device includes a display unit 400 for displaying screen data corresponding to a variety of functions of the mobile device, an input unit 100 for creating a variety of signals according to a user's input, a Speaker (SPK) for outputting audio signals according to the execution of the functions, a Microphone (MIC) for receiving a user's voice or outside audio signals, and a sensing module 300 (as illustrated in FIG. 2) for detecting a user's input.

In an exemplary implementation, the display unit 400 is implemented with a touch screen. The sensing module 300 includes an illumination sensor (or proximity sensor) 310 and a camera module 350. The illumination sensor (or proximity sensor) 310 detects an input of a user who approaches the mobile device, and accordingly provides an input signal. The camera module 350 captures a particular subject in a camera function operating mode, and provides an input signal in a user's input sensing mode.

The sensing module 300 may include various types of sensing units that can detect a user's input and create corresponding detected values. It should be understood that installation positions of the illumination sensor (or proximity sensor) 310 and the camera module 350 are not limited to the positions as illustrated in FIG. 1. That is, the illumination sensor (or proximity sensor) 310 and the camera module 350 may be installed at various positions of the mobile device according to the type of mobile device. Although the exemplary embodiments of the present invention may be implemented in such a manner that the sensing module 300 includes both the illumination sensor (or proximity sensor) 310 and the camera module 350, it should be understood that the present invention is not limited thereto. That is, the exemplary embodiments of the present invention may be modified in such a manner that the sensing module 300 can include at least one of the illumination sensor, the proximity sensor, the camera module, and the like. For example, when the sensing module 300 for receiving multi-inputs is operated via the illumination sensor (or proximity sensor) 310, it does not require the camera module 350 as illustrated in FIG. 1. Alternatively, when the sensing module 300 is operated via the camera module 350, it does not need the illumination sensor (or proximity sensor) 310.

The user can input a single input to the mobile device via the sensing module 300 or via the touch screen of the display unit 400. The user can also input multi-inputs as single inputs are input both to the sensing module 300 and the touch screen. Therefore, the user can control functions corresponding to the respective single inputs and a function corresponding to the multi-inputs. That is, the mobile device can perform functions according to the modes of inputs, i.e., a single input or multi-inputs. An example of a single input on the touch screen may be a scrolling operation. In addition, when multi-inputs are input to the mobile device via the sensing module 300 and the touch screen, it can perform a function according to a single input that is input on the touch screen. The following Table 1 describes examples of functions controlled by single inputs and multi-inputs.

TABLE 1

| | Single inputs via sensing module | Single inputs via touch screen | Multi-inputs | |
|---|---|---|---|---|
| | | | Single object | Multiple objects |
| Functions | Display On/Off | Scroll | Deletion/Copy/ Movement/ Selection | Multi-selection |
| | Hold Mode On/Off | Object Movement | Deletion/Copy/ Selection | Multi-selection |

As described in Table 1, a function for turning on/off the display unit 400 is set when the sensing module 300 detects a single input. Likewise, a scroll function is set when a single input is performed on the touch screen. When multi-inputs are performed in both the sensing module 300 and the touch screen in a state where respective single inputs are set, a single input for the touch screen may be additionally set to perform a first function or a second new function. That is, when a touch signal is input to the touch screen in a state where a proximity signal is input to the sensing module 300, i.e., multi-inputs are input to the mobile device, the first function and the second new function can be set according to input modes of the touch signal. For example, when a touch signal occurs on a single object when multi-inputs are input, one of the functions such as deletion, copy, movement, selection, and the like, excluding scroll, can be set. When a touch signal occurs on multiple objects when multi-inputs are input, a multi-selection function can be set that selects adjacent multiple objects.

In addition, there is a function for turning a hold mode on/off when the sensing module 300 detects a single input. Likewise, when a single input is performed on the touch screen, a function for moving an object selected by the single input can be set. When multi-inputs are input to the mobile device in a state where the respective single inputs are set, a single input for the touch screen may be additionally set to perform a first function or a second new function. That is, when multi-inputs are input to the mobile device, the first function and the second new function can be set according to the types of touch signals input to the touch screen. For example, when a touch signal occurs on a single object when multi-inputs are input, one of the functions such as deletion, copy, selection, and the like, excluding movement, can be set to be applied to the selected object. When a touch signal occurs on multiple objects when multi-inputs are input, a multi-selection function can be set that selects adjacent multiple objects. It should be understood that the first and second functions to be performed according to the multi-inputs can be set by the mobile device manufacturers or the mobile device users.

The following description provides an operation of the mobile device referring to Table 1. The user can turn on/off the display unit 400 by inputting a single input to the sensing module 300. The user can also scroll the screen data by inputting a single input to the touch screen. When the user inputs multi-inputs, i.e., one single input via the sensing module 300 and the other single input via the touch screen, a first function, such as deletion, copy, movement, and selection, or a second function such as multi-selection, can be performed according to the types of touch signals input to the touch screen.

A function mapped to a touch signal that occurs on the touch screen when multi-inputs are input to the mobile device can be set to differ from a function mapped to a touch signal by a single input that is input on the touch screen. That is, the touch signals that occur on the touch screen may be set to perform the functions that differ from each other according to the modes of inputs, i.e., a single input or multi-inputs. In addition, the touch signals can be further set to perform first and second functions, according to the input modes of touch signals, when multi-inputs are input. Therefore, although the user performs the same type of input motions on the touch screen, the mobile device can perform different functions according to whether the input mode is a single input mode or multi-input mode. In addition, according to the types of touch signals input to the touch screen in a multi-input mode, the input touch signals can be set to perform subdivided functions.

FIG. 2 illustrates a schematic block diagram of a mobile device according to an exemplary embodiment of the present invention.

Referring to FIG. 2, the mobile device includes an input unit 100, a storage input 200, a sensing module 300, a display unit 400, and a controller 500. The mobile device may further include components such as a communication module for mobile communication, an audio processing unit including a MIC and a SPK, a digital broadcasting module for receiving and reproducing digital broadcasts (e.g., mobile broadcasting, such as Digital Multimedia Broadcasting (DMB), Digital Video Broadcasting (DVB), and the like), a Bluetooth communication module for Bluetooth communication, an Internet communication module for Internet communication, and the like. The above described components are well known in the art, therefore descriptions and illustrations of the components and their functions are omitted.

The input unit 100 detects a user's operations, creates corresponding input signals, and outputs the input signals to the controller 500. The input unit 100 may include a number of buttons. More particularly, the input unit 100 includes at least one or more buttons that can create input signals for enabling the sensing module 300 or for performing mapped functions.

The storage input 200 stores programs required to operate the mobile device and data generated when the programs are executed. The storage input 200 is implemented with volatile memory devices or non-volatile memory devices or a combination thereof. For example, the storage input 200 stores an operating system of the mobile device. The storage input 200 stores data and programs related to the control operations of the sensing module 300. The storage input 200 stores data and programs related to the control operations of the touch screen (not illustrated). The storage input 200 stores data and programs related to the control operations according to multi-inputs via the sensing module 300 and the touch screen. The storage input 200 permanently or temporarily stores data and programs related to the display control operations of the display unit 400. The storage input 200 can also store a table where functions are mapped to single inputs via the sensing module 300 and the touch screen of the display unit 400 respectively, and multi-inputs via the sensing module 300 and the touch screen. In an exemplary implementation, the mapping table may be configured as Table 1 described above.

The sensing module 300 detects the input of a user who approaches the mobile device, and outputs a corresponding input signal (e.g., a proximity signal) to the controller 500. That is, the sensing module 300 detects a particular object (e.g., a user's body part such as a hand, a finger, and the like) approaching the mobile device, and creates a corresponding input signal. The sensing module 300 can be operated according to a user's selection or execution of a particular application previously set. The sensing module 300 can also be operated when the mobile device is turned on. The sensing module 300 may be configured to include at least one of the illumination sensor, the proximity sensor, and the camera module.

The illumination sensor or proximity sensor detects a particular object approaching the mobile device, creates a corresponding input signal (e.g., a proximity signal), and output the input signal to the controller 500. The illumination sensor or proximity sensor can also detect a user's gesture performed in a space near the mobile device or a user's direct touch input.

The camera module can take a picture of a subject under the control of the controller 500, and outputs the captured data to the display unit 400 and the controller 500. The camera module coverts light received via the camera lens into digital data via a sensor. That is, the camera module includes a camera sensor (not illustrated) for converting light signals into electrical signals and a signal processing unit (not illustrated) for converting the electrical signal into digital data. The camera sensor may be implemented with a Charged-Coupled Device (CCD) or a Complementary Metal-Oxide-Semiconductor (CMOS). The camera module can detect a user's gesture performed in a space near the mobile device. When the camera module detects a particular object (e.g., a user's body, and the like) in the capture range, it creates a corresponding input signal (e.g., a proximity signal) and outputs it to the controller 500. When the camera module operates to detect a user's input, the data acquired by the camera module is processed as background data that is not displayed via the display unit 400 but is used only as information for the user's input.

Although FIG. 2 illustrates the configuration of the mobile device that describes the creation of the input signals (e.g., proximity signals) according to multi-inputs based on the sensing module 300, it should be understood that the invention is not limited thereto. For example, the input signals corresponding to the proximity signals for multi-inputs may also be created via a variety of devices such as a touch pad, a microphone, and the like. In an exemplary implementation, a combination of input signals via a touch pad and a touch screen can provide control of a corresponding function according to multi-inputs. Alternatively, a combination of input signals via a microphone and a touch screen can provide control of a corresponding function according to multi-inputs.

The display unit 400 displays screens when applications for a variety of functions are executed in the mobile device. For example, examples of the functions are a message, an email, internet, multimedia, a search, communication, electronic book reading, video data playback, photographing, photograph viewing, TeleVision (TV) viewing (e.g., mobile broadcasts such as DMB, DVB, and the like), audio playback (e.g., a Moving Picture Expert Group (MPEG)-1 or MPEG-2 Audio Layer 3 (MP3) file), a widget, and the like. The display unit 400 may be implemented with a Liquid Crystal Display (LCD), an Organic Light Emitting Diode (OLED), an Active Matrix OLED (AMOLED), and the like.

The display unit 400 can display screen data in a landscape mode or a portrait mode. The display unit 400 may further include a touch input unit (not illustrated). The display unit 400 may be implemented with a touch screen. The display unit 400 creates an input signal (e.g., a touch signal) according to a user's input on the touch screen, and outputs it to the controller 500. The display unit 400 can display screen data when a user's input (e.g., a single input) is made in at least one of the devices, i.e., the sensing module 300 and the touch screen. The display unit 400 can also display screen data when a user's inputs (e.g., multi-inputs) are made by a combination of the sensing module 300 and the touch screen.

The controller 500 controls the entire operation of the mobile device. The controller 500 controls the functions according to the respective single inputs via the sensing module 300 and the touch screen of the display unit 400 and according to the multi-inputs via a combination of the sensing module 300 and the touch screen. That is, when the sensing module 300 or the touch screen detects a user's input, the controller 500 determines that the detected user's input is a single input and then controls a function corresponding to the input signal (e.g., a proximity signal or touch signal) created via the single input. Likewise, when both the sensing module 300 and the touch screen detect a user's inputs respectively, i.e., two single inputs, the controller 500 determines that the detected user's inputs are multi-inputs and then controls a function corresponding to the input signals (e.g., a proximity signal or a touch signal) created via the multi-inputs. More particularly, the controller 500 can distinguish and control the first and second functions according to the input mode of the touch signal that occurs on the touch screen, where the touch signal is one of the input signals created via the multi-inputs. In addition, the controller 500 can control a variety of operations. For example, the controller 500 can control other applications according to signals detected by the sensing module 300.

The operations of the controller 500 will be described in more detail below with reference to flowcharts describing a method for controlling functions in the mobile device.

The mobile device as illustrated in FIGS. 1 and 2 can be applied to all types of mobile devices, for example, a bar type, a folder type, a slide type, a swing type, a flip-flop type, and the like. The mobile device according to an exemplary embodiment of the present the invention includes all information communication devices, multimedia devices, and their applications, which are operated according to communication protocols corresponding to a variety of communication systems. For example, the mobile device can be applied to mobile communication terminals, Portable Multimedia Players (PMPs), digital broadcast players, Personal Digital Assistants (PDAs), audio players (e.g., MP3 players), mobile game players, smart phones, and the like. In addition, the method for controlling functions via multi-inputs by the sensing module 300 and touch screen, according to an exemplary embodiment of the present invention, can also be adapted to TVs, Large Format Displays (LFDs), Digital Signages (DSs), media poles, personal computers, laptop computers, and the like.

Figure 3:
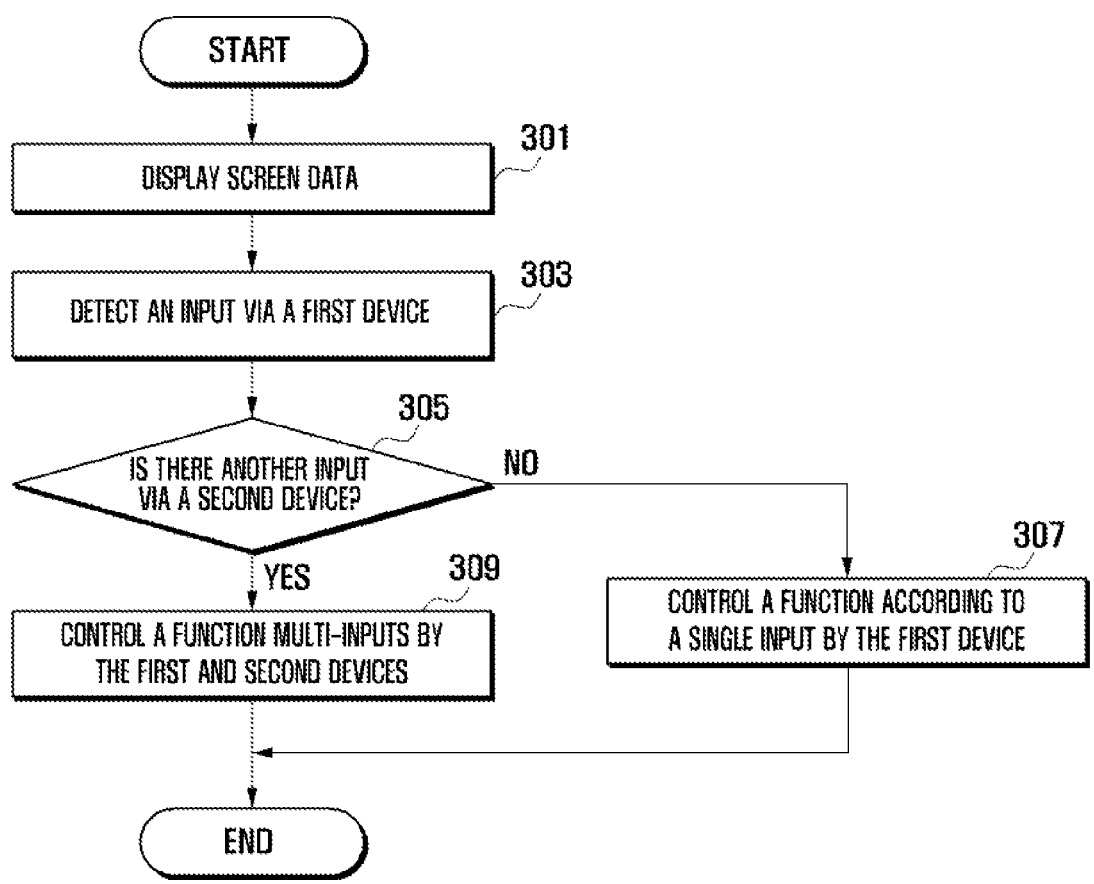
FIG. 3 illustrates a flowchart describing a method for controlling functions in a mobile device via multi-inputs, according to an exemplary embodiment of the present invention.

FIG. 3 illustrates a flowchart describing a method for controlling functions in a mobile device via multi-inputs, according to an exemplary embodiment of the present invention.

Referring to FIG. 3, the controller 500 controls the display of screen data at step 301. For example, when a user generates an input for selecting a screen illustrating a list of at least one or more objects (e.g., a message list, a call list, and the like) or a screen containing at least one item (e.g., an icon, a widget, a menu, and the like), the controller 500 receives the input signal and then displays screen data corresponding thereto. Alternatively, the controller 500 can control the display of screen data according to an application selected and executed by the user.

While displaying the screen data, the controller 500 detects an input by a first device at step 303. Thereafter, the controller 500 determines whether there is an input via a second device at step 305. In an exemplary implementation, the first and second devices may be implemented with a sensing module or a touch screen. For example, when the first device is implemented with the sensing module, the second device is a touch screen. Alternatively, when the first device is a touch screen, the second device may be a sensing module.

When the controller 500 determines that there is not an input via a second device at step 305, it controls a function according to a single input via the first device at step 307. On the contrary, when the controller 500 detects an input via a second device at step 305, it controls a function according to multi-inputs via the first and second devices at step 309.

As described above, the controller 500 can control a function of the mobile device according to a single input via the first device. The controller 500 can also control a function of the mobile device according to multi-inputs via the first and second devices. The following description is provided regarding controlling the functions of the mobile device with respect to cases where the first and second devices are a sensing module and a touch screen, respectively, and where a touch screen and a sensing module, respectively.

First, when the first device and second device are a sensing module 300 and a touch screen, respectively, the mobile device 100 can be operated as described below with reference to FIG. 3.

Referring to FIG. 3, the controller 500 displays screen data according to a user's request at step 301. When the controller 500 detects a proximity signal via the sensing module 300 at step 303, it concludes that the proximity signal is a single input. Thereafter, the controller 500 determines whether a touch signal occurs on the touch screen at step 305.

When the controller 500 determines that a touch signal does not occur on the touch screen at step 305, it controls a function corresponding to the proximity signal created according to a single input via the sensing module 300 at step 307. For example, the controller 500 can turn on/off the display unit 400 according to the proximity signal.

On the contrary, when the controller 500 detects a touch signal on the touch screen at step 305, it concludes that the proximity signal and the touch signal are multi-inputs performed by a combination of the different devices, i.e., the sensing module 300 and the touch screen. That is, the controller 500 concludes that the proximity signal, created by the signal input via the sensing module 300, and the touch signal, created by the single input via the touch screen, are multi-inputs. Thereafter, the controller 500 controls a function according to the multi-inputs at step 309. For example, when the controller 500 detects the multi-inputs created as the proximity signal and the touch signal are simultaneously input, it controls a function mapped to the touch signal according to the multi-inputs, not to a touch signal according to a single input. More particularly, when the controller 500 detects a touch signal on the touch screen while a proximity signal is being retained via the sensing module 300, it can control a function set according to an input mode of the touch signal. For example, when the touch signal is input to a single object, the controller 500 executes a first function. When the touch signal is input to multiple objects, the controller 500 executes a second function. In an exemplary implementation, the touch signal refers to an input signal created on the touch screen of the display unit 400. That is, the touch signal may be created by a drag, a flick, a sweep, a movement, and the like.

For example, it is assumed that the touch signal is created by a drag gesture and is called a drag signal. When the controller 500 detects a drag signal according to a signal input, it can control a function (e.g., a scroll) mapped to the drag signal. On the contrary, when the controller 500 detects a drag signal according to multi-inputs, it can control a first or second function according to whether the drag signal occurs on a single object or multiple objects. For example, the controller 500 executes a first function, i.e., deletion, copy, selection or movement, with respect to the object selected according to the drag signal, or a second function, i.e., multi-selection, with respect to the multiple objects selected according to the drag signal. Although it is not described and illustrated in the foregoing section, it should be understood that, when a drag signal for multi-inputs occurs in an area where any object is not selected, the controller 500 may perform other functions such as a screen switch, and the like.

Second, when the first device and second devices are a touch screen and a sensing module 300 respectively, the mobile device 100 can be operated as described below with reference to FIG. 3.

Referring to FIG. 3, the controller 500 displays screen data according to a user's request at step 301. When the controller 500 detects a touch signal on the touch screen at step 303, it concludes that the touch signal is a single input. Thereafter, the controller 500 determines whether a proximity signal is input via the sensing module 300 at step 305.

When the controller 500 determines that a proximity signal is not input via the sensing module 300 at step 305, it controls a function corresponding to the touch signal according to a single input via the touch screen at step 307. For example, the controller 500 can scroll screen data according to the touch signal.

On the contrary, when the controller 500 detects a proximity signal via the sensing module 300 while the touch signal is being retained at step 305, it concludes that the touch signal and the proximity signal are multi-inputs performed by a combination of the different devices, i.e., the touch screen and the sensing module 300. That is, the controller 500 concludes that the touch signal, created by the single input via the touch screen, and the proximity signal, created by the signal input via the sensing module 300, are multi-inputs. Thereafter, the controller 500 controls a function according to the multi-inputs at step 309. For example, when the controller 500 detects the multi-inputs created as the touch signal and the proximity signal are simultaneously input, it controls a function mapped to the touch signal according to the multi-inputs, not to a touch signal according to a single input. More particularly, when the controller 500 detects a proximity signal via the sensing module 300 while a touch signal is being retained via the touch screen, it can control a function set according to an input mode of the touch signal. For example, when the touch signal is input to a single object, the controller 500 executes a first function. When the touch signal is input to multiple objects, the controller 500 executes a second function.

Figure 4:
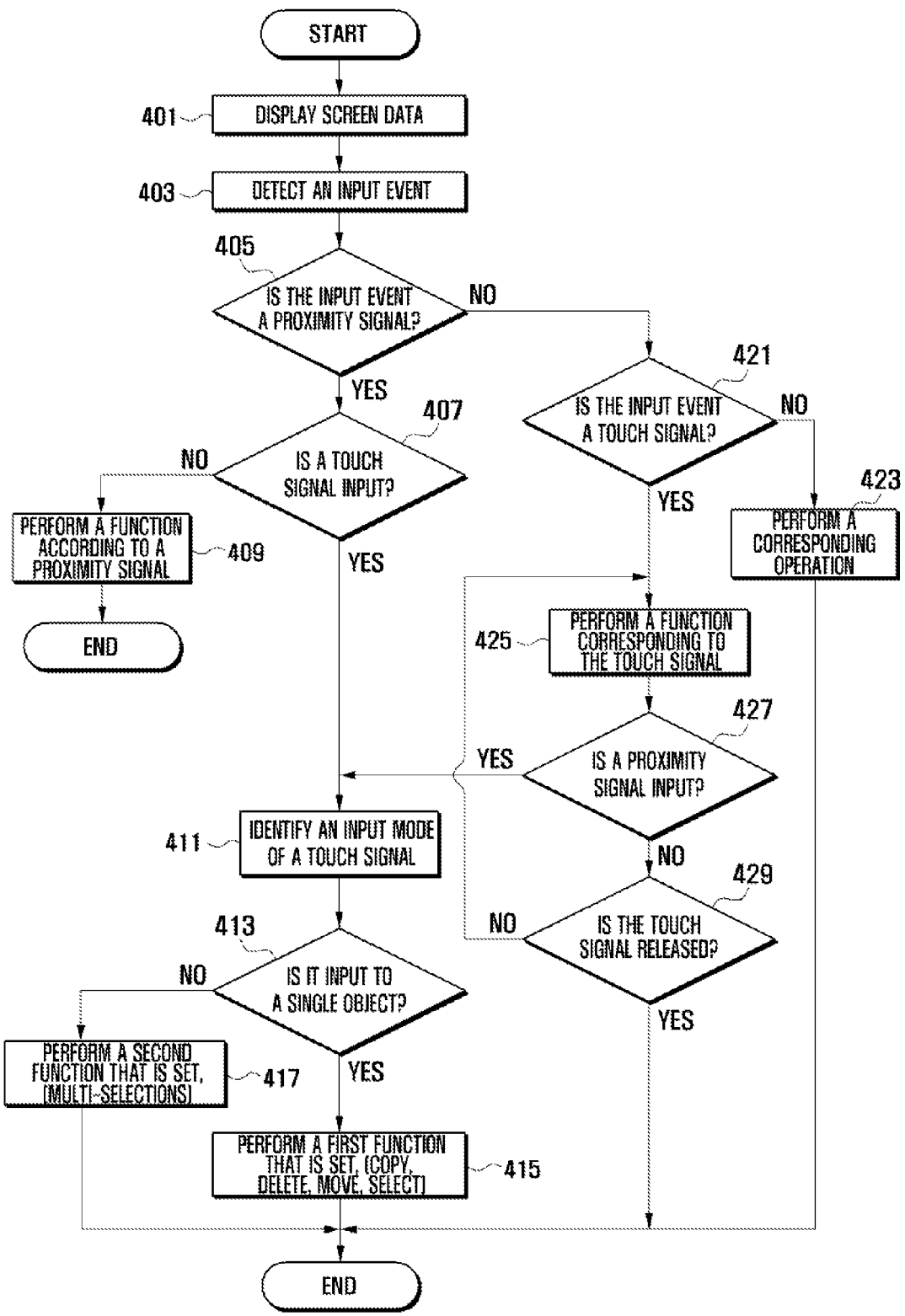
FIG. 4 illustrates a flowchart describing a method for controlling functions in a mobile device via a single input and multi-inputs, according to an exemplary embodiment of the present invention.

FIG. 4 illustrates a flowchart describing a method for controlling functions in a mobile device via a single input and multi-inputs, according to an exemplary embodiment of the present invention.

Referring to FIG. 4, the controller 500 controls the display of screen data at step 401. For example, when the user generates an input for selecting a screen illustrating a list of at least one or more objects (e.g., a message list, a call list, and the like) or a screen containing at least one item (e.g., an icon, a widget, a menu, and the like), the controller 500 receives the input signal and then displays screen data corresponding thereto. Alternatively, the controller 500 can control the display of screen data according to an application selected and executed by the user.

While displaying the screen data, the controller 500 detects an input event at step 403. Thereafter, the controller 500 identifies the type of the input event at step 405. That is, the controller 500 determines whether the input event is an event corresponding to a proximity signal or a touch signal. In an exemplary implementation, it is assumed that a proximity signal is created by a single input via the sensing module 300 and a touch signal is generated by a single input via the touch screen. In addition, when a proximity signal and a touch signal are simultaneously created, the controller 500 concludes that multi-inputs occur.

For example, when the controller 500 determines that the input event is an event corresponding to a proximity signal at step 405, it further determines whether a touch signal is created while the proximity signal is being retained at step 407. When the controller 500 determines that a touch signal is not created at step 407, it performs a function corresponding to the proximity signal at step 409. For example, the controller 500 can turn on/off the display unit 400 according to the proximity signal as a single input in the normal mode.

On the contrary, when the controller 500 determines that a touch signal is created at step 407, it identifies the input mode of the touch signal at step 411. The controller 500 determines whether the input mode of the touch signal is for a single object or multiple objects at step 413.

When the controller 500 determines that the input mode of the touch signal is for a single object at step 413, it performs a first function at step 415. For example, when the touch signal for multi-inputs, for example, a tap gesture, is input to an object, the controller 500 can execute a function, i.e., copy, deletion, movement, selection, and the like, with respect to the object. That is, the controller 500 can control a first function mapped to a touch signal for multi-inputs. For example, the controller 500 can delete, copy, move, or select the object (or item) according to the touch signal for multi-inputs.

On the contrary, when the controller 500 determines that the input mode of the touch signal is for multiple objects at step 413, it performs a second function at step 417. For example, when the touch signal for multi-inputs, for example, a drag gesture, is input to multiple objects, the controller 500 can execute a function, i.e., multi-selection, and the like, with respect to the objects. That is, when the user designates items in the list via a block in the direction of the touch signal, i.e., multi-inputs or multi-selections, the controller 500 can control a second function mapped to the touch signal for multi-inputs.

As described above, a touch signal serves to perform a function for a single input or a function for multi-inputs according to the input modes.

Meanwhile, when the controller 500 determines that the input event is not an event corresponding to a proximity signal at step 405, it further determines whether the input event is an event corresponding to a touch signal at step 421. When the controller 500 determines that the input event is not an event corresponding to a touch signal at step 421, it performs an operation corresponding to the input event at step 423. For example, when the input event is a menu selection, the controller 500 activates the selected menu. In addition, when the input event is to execute a function, e.g., a camera function, the controller 500 executes the camera function.

On the contrary, when the controller 500 determines that the input event is an event corresponding to a touch signal at step 421, it controls a function corresponding to the touch signal at step 425. For example, the controller 500 can scroll screen data according to the touch signal for a single input in a normal mode.

While performing the function according to the touch signal (i.e., the touch signal is being input) at step 425, the controller 500 determines whether a proximity signal is input at step 427. When the controller 500 determines that a proximity signal is not input at step 427, it further determines whether the input touch signal is released at step 429. When the controller 500 determines that the input touch signal is not released at step 429, it returns to step 425. On the contrary, when the controller 500 determines that the input touch signal is released at step 429, the procedure ends.

Meanwhile, when the controller 500 determines that a proximity signal is input at step 427, it returns to step 411 to control the execution of the first function or the second function according to the input mode of the touch signal. For example, when the user approaches the sensing module 300 with an object, such as a finger, while an operation is being performed in the mobile device according to a touch signal, the controller 500 receives the input signal (e.g., the proximity signal). When the controller 500 receives the proximity signal while a touch signal is being retained on the touch screen, it concludes that multi-inputs have occurred and then identifies the input mode of the touch signal. In this case, the controller 500 may stop executing the function corresponding to the touch signal of a single input. Thereafter, the controller 500 can control a new function according to the input mode of the touch signal for the multi-inputs. For example, when the controller 500 detects a proximity signal while performing a scroll function corresponding to a touch signal of a single input, it stops performing the scroll function and then controls a first or second function corresponding to the input mode of a touch signal for multi-inputs.

Figure 5:
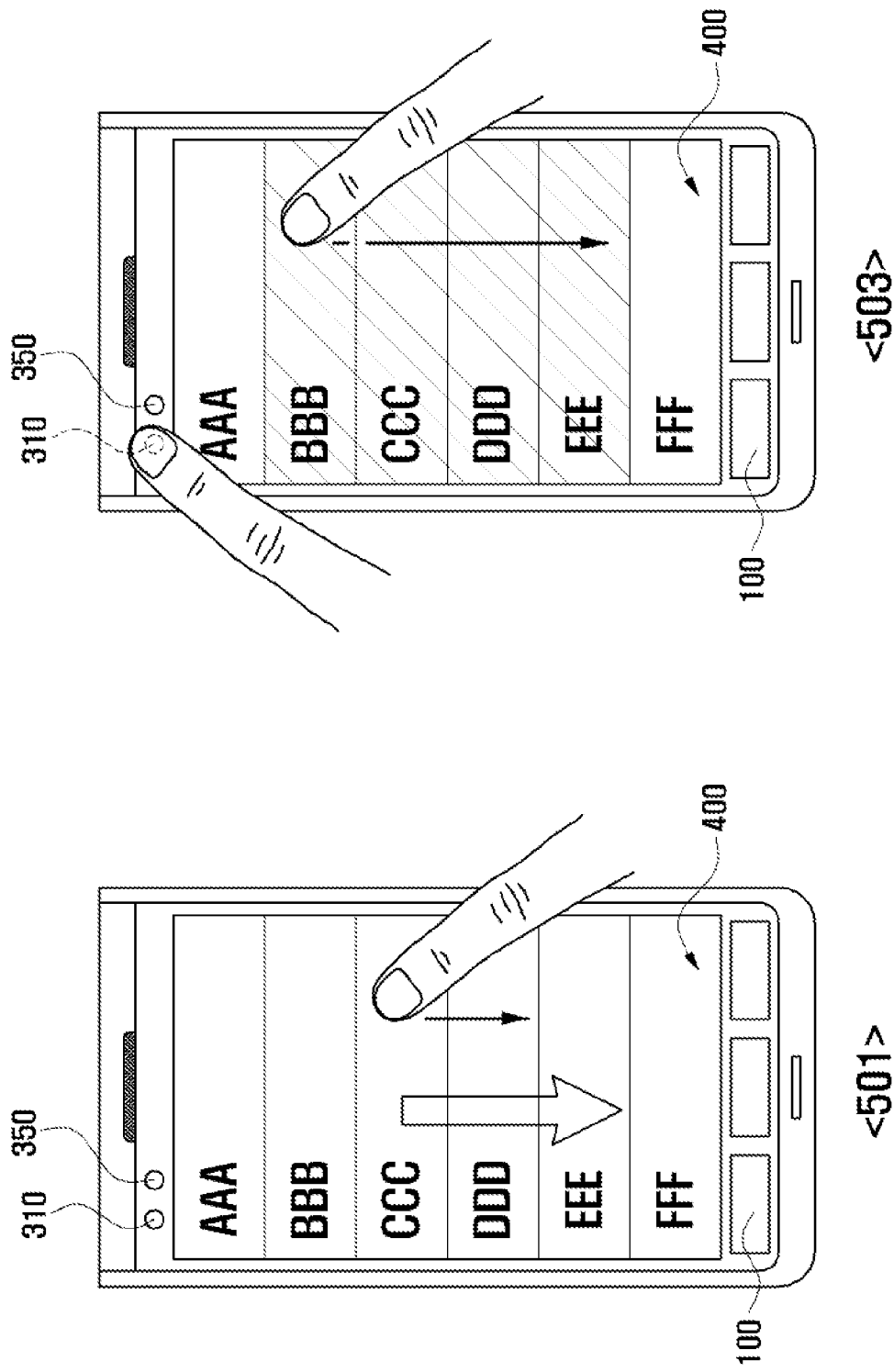
FIG. 5 illustrates exemplary screens describing a method for controlling functions in a mobile device via a single input and multi-inputs, according to an exemplary embodiment of the present invention.

FIG. 5 illustrates exemplary screens describing a method for controlling functions in a mobile device via a single input and multi-inputs, according to an exemplary embodiment of the present invention.

Referring to FIG. 5, it is assumed that the display unit 400 is displaying screen data according to a user's request as illustrated in diagrams 501 and 503. In an exemplary implementation, the screen data refers to a list of at least one or more objects, such as a message list, a call list, and the like. The user can apply a single input or multi-inputs to the mobile device while screen data is being displayed as illustrated in diagrams 501 and 503.

As illustrated in diagram 501, the user can apply a single input by touching the display unit 400 with his/her finger and moving it in a downward direction. The single input may serve to control a scroll function of the screen data. The single input for controlling a scrolling operation may be created by a drag gesture, a flick, a sweep, a movement, and the like. As illustrated in diagram 501, when a movement gesture, i.e., a single input, is performed on the display unit 400 in the arrow direction, i.e., in a downward direction, the screen data is scrolled in the same direction.

In addition, as illustrated in diagram 503, the user can apply a single input to a space near the sensing module (310 or 350) with his/her finger or a single input by touching the sensing module (310 or 350) with his/her finger. Simultaneously, the user can also apply another single input, i.e., a touch signal, by touching the display unit 400 with his/her finger and moving it in a downward direction. That is, the user can apply multi-inputs to the sensing module (310 or 350) and the display unit 400.

In an exemplary implementation, it is assumed that the function of a touch signal for multi-inputs is a second function, i.e., a multi selection. For example, the function of a touch signal for multi-inputs is to select at least one of the objects contained in the screen data and to designate it with a block. The touch signal for selecting and designating objects with a block can be created by a drag gesture, a flick, a sweep, a movement, and the like. When the touch signal for multi-inputs is input to multiple objects, the selected objects (e.g., 'BBB,' 'CCC,' 'DDD,' and 'EEE') can be selected as illustrated in diagram 503.

Figure 6:
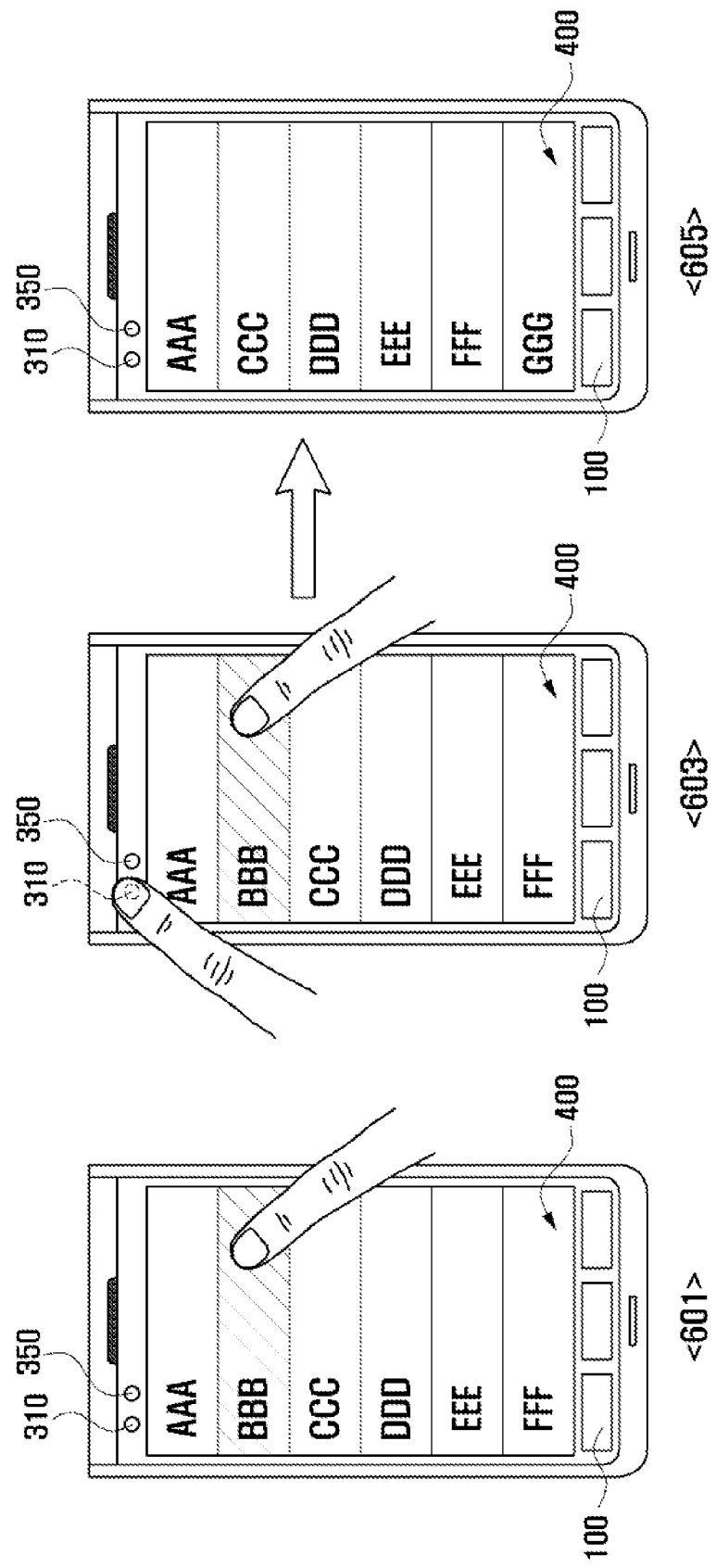
FIG. 6 illustrates exemplary screens describing a method for controlling functions in a mobile device via a single input and multi-inputs, according to an exemplary embodiment of the present invention.

FIG. 6 illustrates exemplary screens describing a method for controlling functions in a mobile device via a single input and multi-inputs, according to an exemplary embodiment of the present invention.

Referring to FIG. 6, it is assumed that the display unit 400 is displaying screen data according to a user's request as illustrated in diagram 601. It is also assumed that FIG. 6 illustrates the same screen data as FIG. 5. In addition, it is assumed that the function corresponding to a touch signal for a single input is to select an object as illustrated in diagram 601, and the function corresponding to a touch signal for multi-inputs is one of the first functions, i.e., deletion.

As illustrated in diagram 603, the user can apply a single input via the sensing module (310 or 350) and a single input via the display unit 400. That is, multi-inputs can be input via different devices. When a touch signal for multi-inputs occurs on a single object as illustrated in diagram 603, the touched object (e.g., 'BBB') is removed from the display unit 400 as illustrated in diagram 605.

Figure 7:
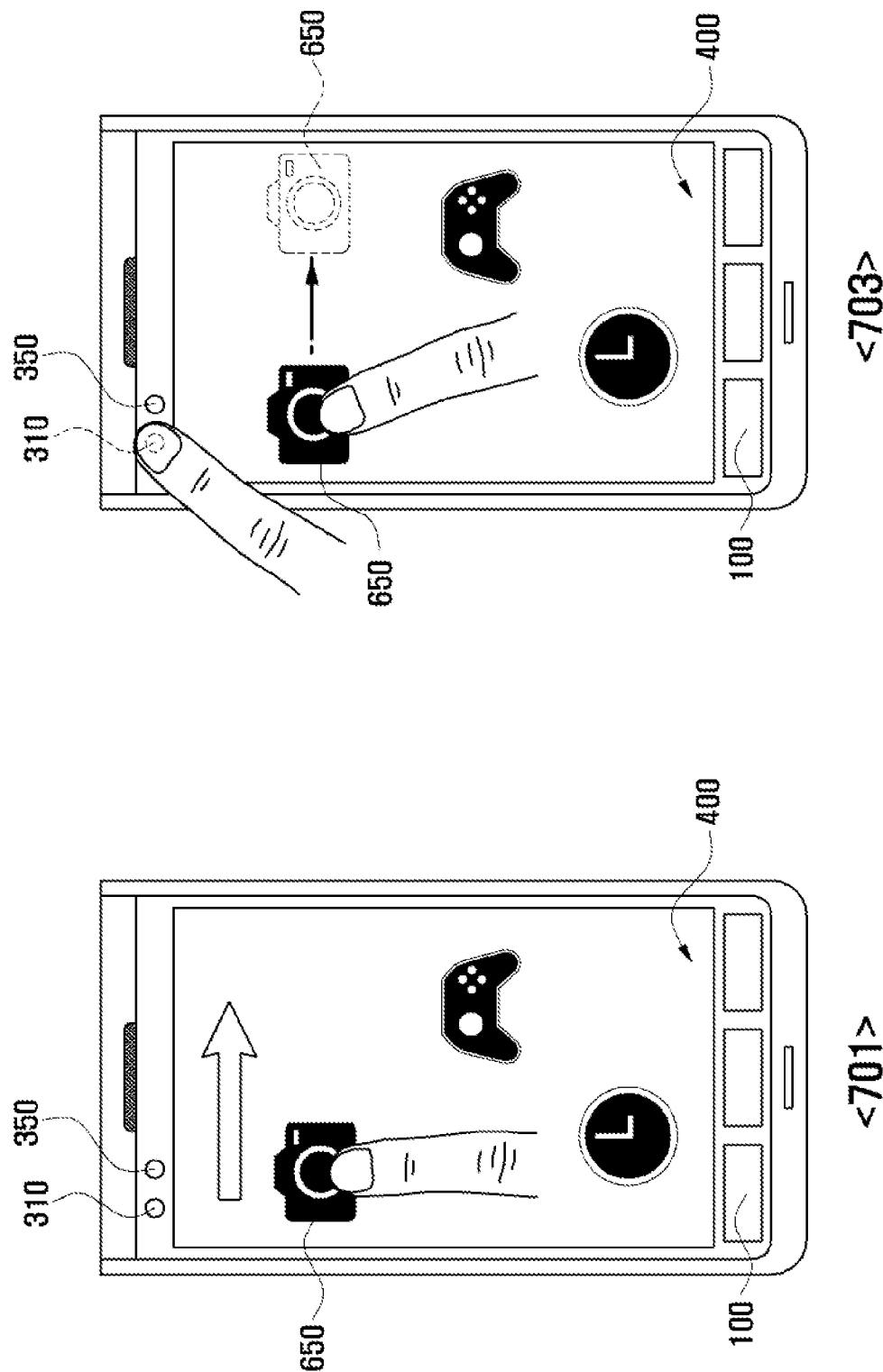
FIG. 7 illustrates exemplary screens describing a method for controlling functions in a mobile device via a single input and multi-inputs, according to an exemplary embodiment of the present invention.

FIG. 7 illustrates exemplary screens describing a method for controlling functions in a mobile device via a single input and multi-inputs, according to an exemplary embodiment of the present invention.

Referring to FIG. 7, it is assumed that the display unit 400 is displaying screen data according to a user's request as illustrated in diagrams 701 and 703. In an exemplary implementation, the screen data refers to a list of at least one or more objects, such as a widget item, a menu item, a function item, and the like. The user can apply a single input or multi-inputs to the mobile device while screen data is being displayed as illustrated in diagrams 701 and 703.

As illustrated in diagram 701, the user can apply a single input by touching the display unit 400 with his/her finger and moving it in the right direction. In this case, as illustrated in diagram 605, the item touched by the single input is moved. In addition, the single input may serve to control a scroll function of the screen data. The single input for controlling a scroll function may be created by a drag gesture, a flick, a sweep, a move, and the like. As illustrated in diagram 701, when a movement gesture, i.e., a single input, is performed on the display unit 400 in the arrow direction, i.e., in the right direction, the screen data is scrolled in the same direction.

In addition, as illustrated in diagram 703, the user can apply a single input to a space near the sensing module (310 or 350) with his/her finger or a single input by touching the sensing module (310 or 350) with his/her finger. Simultaneously, the user can also apply another single input, i.e., a touch signal, by touching the display unit 400 with his/her finger and moving it in the right direction. That is, the user can apply multi-inputs to the sensing module (310 or 350) and the display unit 400.

In an exemplary implementation, it is assumed that the function of a touch signal for multi-inputs is one of the first functions, i.e., movement. For example, the function of a touch signal for multi-inputs is to select and move one of the objects contained in the screen data. The touch signal for selecting and moving an object (or objects) can be created by a drag gesture, a flick, a sweep, a movement, and the like. When the touch signal for multi-inputs is input to a single object, the touched object 650 can be moved as illustrated in diagram 703.

FIG. 8 illustrates exemplary screens describing a method for controlling functions in a mobile device via a single input and multi-inputs, according to an exemplary embodiment of the present invention.

Referring to FIG. 8, it is assumed that the display unit 400 is displaying screen data according to a user's request as illustrated in diagrams 801 and 803. It is also assumed that FIG. 8 illustrates the same screen data as FIG. 7. In addition, it is assumed that the function corresponding to a touch signal for a single input is to move a selected object as illustrated in diagram 801, and the function corresponding to a touch signal for multi-inputs is one of the first functions, i.e., deletion.

As illustrated in diagram 803, the user can apply a single input via the sensing module (310 or 350) and a single input via the display unit 400. That is, multi-inputs can be input via different devices. When a touch signal for multi-inputs occurs on a single object as illustrated in diagram 803, the touched object 650 is removed from the display unit 400 as illustrated in diagram 805.

As described above, the method and system according to the exemplary embodiments of the present invention can control functions of a mobile device according to various types of inputs using different modes of input devices. That is, the method and system can easily and rapidly control functions of the mobile device according to a single input and/or multi-inputs performed by a combination of a touch screen and a sensing module, without executing complicated menus. Therefore, the method and system for controlling functions of the mobile device via multi-inputs can enhance the use convenience, access and competitiveness by using different types of input devices.

In addition, the method and system for controlling functions of the mobile device via multi-inputs performed by a combination of different input devices, according to the exemplary embodiments of the present invention, can be implemented with program commands that can be conducted via various types of computers and recorded in computer-readable recording media. The computer-readable recording media contain program commands, data files, data structures, and the like, or a combination thereof. The program commands recorded in the recording media may be designed or configured to comply with the exemplary embodiments of the present invention or may be software well-known to the ordinary person skilled in the art.

The computer-readable recoding media includes hardware systems for storing and conducting program commands. Examples of the hardware systems are magnetic media such as a hard disk, a floppy disk, a magnetic tape, optical media such as Computer Disc Read Only Memory (CD-ROM) and Digital Versatile Disc (DVD), Magneto-Optical Media such as a floptical disk, a ROM, a Random Access Memory (RAM), a flash memory, and the like. The program commands include assembly language or machine code complied by a compiler and a higher level language interpreted by an interpreter. The hardware systems may be implemented with at least one software module to comply with the exemplary embodiments of the present invention.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A mobile device comprising:
   a touch screen for displaying a screen and for detecting a touch input;
   a sensing module for detecting a proximity input;
   a storage unit configured to store one or more programs used to operate the mobile device and to store data generated when the one or more programs are executed; and
   one or more processors configured to:
      control the touch screen to display a Graphical User Interface (GUI);
      determine whether the proximity input is detected by the sensing module when the touch input is detected;
      perform a first function according to the touch input corresponding to the GUI if the proximity input is not detected; and
      perform a second function according to the touch input corresponding to the GUI while the proximity input is detected.

2. The mobile device of claim 1, wherein the sensing module comprises at least one of an illumination sensor, a proximity sensor, and a camera module.

3. The mobile device of claim 2, wherein the performing of the first function comprises:
   performing one of copy, deletion, movement and selection of the single object.

4. The mobile device of claim 2, wherein the performing of the second function comprises:
   performing a multi selection of the multiple objects.

5. The mobile device of claim 2, wherein the performing of the second function comprises:
   performing a drag gesture to the multiple objects.

* * * * *